United States Patent Office 2,873,205
Patented Feb. 10, 1959

2,873,205
PROCESS FOR FORMING LUMINESCENT SCREENS

Rinse Dijkstra, Jelis de Jonge, and Hendrik Anne Klasens, Eindhoven, Netherlands, assignors, by mesne assignments, to North American Philips Company, Inc., New York, N. Y., a corporation of Delaware No Drawing. Application March 22, 1956
Serial No. 573,097

Claims priority, application Netherlands March 24, 1955

5 Claims. (Cl. 117—33.5)

This invention relates to the coating of luminescent screens obtained by a settling process with a thin film of organic material.

It is frequently desirable for luminescent screens for example for cathode-ray tubes or electron microscopes, to be coated with a thin film of organic material, for example nitrocellulose. It is no simple task to form such a film and consequently, a large number of processes have been described for providing these films. The important problem always involved is to avoid that the film-forming organic material penetrates between the grains of the luminescent screen. It is thus common practice to fill up the cavities between the grains with a liquid, for example water, and to remove it after the film has been formed, for example by evaporation.

It is not necessary for the liquid between the grains of the luminescent material to reach exactly to the peaks of the grains. It is known that highly satisfactory films of organic material may also be provided by coating the luminescent screen, for example by immersion, with an amount of liquid, hereinafter to be referred to as liquid bed, which is such that its level lies above the peaks of the grains. When this process is used, there are two further possibilities for providing the organic film. In one process there is provided on the liquid bed an amount of solution of the organic material which contains exactly so much organic film-forming substance as is required for forming the film and which has a specific weight lower than that of the liquid bed and thus swims on it. In the other process there is provided on the liquid bed an amount of solution of the organic material which contains more organic film-forming substance than is necessary for forming the film and which has a specific weight lower than that of the liquid bed and hence swims on it. In the first-mentioned process, the film is formed as follows: The luminescent screen is coated with the liquid bed and the proper amount of solution of the film-forming material is poured onto the surface thereof. Subsequently the solvent is evaporated from the solution, a swimming solid film of the organic material thus being formed on the liquid bed. The liquid bed is then carefully removed, for example by decanting or siphoning off, so that the swimming film deposits itself on the luminescent screen. Finally, the liquid still enclosed between the grains of the luminescent screen is removed, for example by evaporation.

The other process referred to above is as follows: The luminescent screen is coated with the liquid bed and an amount of solution of the film-forming material is poured onto its surface. Subsequently, the liquid bed and the solution of the organic material swimming thereon is decanted in such manner that the swimming solution flows along the luminescent screen, leaving thereon a thin layer of solution of the organic material from which the solvent is subsequently evaporated, a thin organic film thus being formed on the grains of luminescent material. Finally, any liquid enclosed between the grains of the luminescent screen is removed, for example by evaporation.

The organic film may serve, for example, as a temporary substratum for metal-backing of the luminescent screen as is frequently used when the luminescent screen is incorporated in a cathode-ray tube. In this case the organic film after metal-backing is usually removed by heating.

The luminescent screen itself may be provided in different ways, but it is nowadays common practice, more particularly in the manufacture of cathode-ray tubes, to utilise a settling process. In this process a substratum for example the base of a cathode-ray tube, is coated with a settling bed, for example water, in which finely-divided luminescent material is suspended. When this suspension is not disturbed for a time, the grains of luminescent material settle down slowly and distribute very regularly on the substratum. In order to ensure adhesion of the grains on the substratum, potassium- and/or sodium silicate is dissolved in the settling bed and furthermore an alkali metal and/or alkaline-earth compound is added. The term "alkali metal compounds" to be understood in this case to mean also ammonium salts. Compounds which can be used very well are, for example, potassium sulphate, barium nitrate, calcium acetate or ammonium sulphate. After the greater portion of the luminescent material has settled down, the settling bed is carefully decanted.

As may appear from a comparison between the processes or forming the organic film and the process for forming the luminescent screen, all these processes require an amount of liquid, which is at a certain level above the peaks of the grains of luminescent material and above the substratum for the luminescent screen. Since after the settling of the luminescent grains in forming the luminescent screen the settling bed is still above the screen then formed, the idea has arisen to utilise the settling bed as the liquid bed in forming the organic film. This seems a very logic idea, since after the settling bed has been decanted, a new amount of liquid must be introduced for forming the organic film. However, it has been found extremely difficult to form a satisfactory film if the settling bed is used as the liquid bed in providing the organic film. Consequently, one hitherto has always adapted the complicated and time-consuming method of decanting the settling bed and renewed introduction of an amount of water as the liquid bed for providing the organic film.

The object of the invention is to avoid the loss of time resulting from the renewed introduction of a liquid bed after the settling bed has been decanted whilst nevertheless obtaining satisfactory organic films.

A process according to the invention for coating a luminescent screen obtained by settling of luminescent material in an aqueous settling bed producing alkaline reaction (pH higher than 9.5) which contains in solution potassium- and/or sodium silicate and an alkali metal and/or alkaline-earth compound, with a thin coherent film of organic material by providing on the settling bed a solution of this organic material having a specific weight lower than that of the settling bed and removing the settling bed is characterized in that the pH-value of the settling bed, after settling and adhesion of the luminescent material and before application of the solution of the organic material, is reduced to a value comprised between 5 and 8.5.

The extensive tests having led to the invention have revealed that the unsatisfactory formation of film when using the settling bed as the liquid bed in providing the film is due to the alkalinity of the settling bed, since for obtaining satisfactory adhesion of the luminescent material it is necessary to use an amount of silicate such that the liquid has a pH-value higher than 9.5. If a solution of the organic film-forming material is provided on the settling bed producing alkaline reaction, an emulsion is formed on the separating surfaces of the liquids, resulting in very irregular films having a dull appearance and streaks. By reducing the pH-value in accordance with the invention, said formation of an emulsion is avoided and smooth organic films are obtained.

The pH-value may be reduced in a very simple manner, by adding to the settling bed an amount of acid, more particularly phosphoric acid, or by adding acid reacting salts, for example acid reacting sodium phosphate. The application of the solution of the organic film-forming material need not be delayed till the pH-value is the same throughout the settling bed. However, the added amount of acid or salt solution is such, that with a homogenous distribution in the settling bed the pH-value lies between the above-mentioned limits.

It has previously been suggested to acidify during settling a settling bed in which only a silicate is dissolved so that the pH-value comes to lie between 6 and 7.5. The object thereof is to improve the adhesion. However, it has been found very difficult to obtain a regular and satisfactorily adhering luminescent screen with the use of such an acidified settling bed, since during settling flocculation then readily occurs, which completely disturbs regular settling. In this known method no reference is made to the provision of an organic film on the luminescent screen.

According to the invention the above-mentioned disadvantages are avoided by reducing the pH-value of the settling bed only after the luminescent screen has been formed.

The process according to the invention may be used for both methods mentioned in the preamble for providing the organic film, viz. that whereby an amount of solution of the organic substance is provided on the settling bed, which solution contains organic substance exactly sufficient for forming the film, and that whereby the solution contains an excess amount of organic film-forming substance.

If desirable, a portion of the settling bed may be removed after settling, whereafter the remaining portion is acidified till its pH-value lies between 5 and 8.5. This is particularly advantageous if the solution of organic material to be provided contains exactly so much organic material as is required for producing the film, since as has been explained in the preamble, the film then forms in the solid state swimming on the settling bed. It will be evident that in decanting the settling bed to allow deposition of the film on the luminescent screen, it is advantageous if the amount of liquid is small.

The materials hitherto known may be used for the organic film. Among these materials nitrocellulose occupies the most important place, although satisfactory films may also be formed, for example, with esters of polymethacrylic acid. Solvents used for these substances may be butyl acetate ethyl acetate or mixtures thereof. Furthermore, it is possible to add softening agents, for example dibutylphthalate.

In order to make the invention better understood one example will now be described for coating a cathode-ray tube with a circular screen of 22 cms. in diameter with a luminescent substance and an organic film.

1 litre of water is introduced into the tube and subsequently 20 mls. of a 2%-solution of barium nitrate are added. By means of a distributing funnel, a suspension of 2 gms. of luminescent material in a mixture of 12 mls. of potassium silicate (containing 19.3% or $SiO_3$) and 188 mls. of water are introduced into said solution. The tube is left untouched for 15 to 20 minutes and during this time the luminescent screen is formed. Subsequently, 32 mls. of a semimolar $H_3PO_4$-solution are provided on the surface of the settling bed, the pH-value then adjusting itself to a value of about 7. After some minutes, 35 ccs. of a solution of organic material are added. This solution is of the following composition:

Dry nitrocellulose (I. C. I. Grade HL 30–40) __gs__ 90
Ethyl acetate 9% by weight _____mls__ 215
Butyl acetate _____mls__ 2100
Dibutylphthalate _____mls__ 45

After the organic solution has spread regularly over the surface of the settling bed, which takes about 2 minutes, the tube is slowly tipped and the settling bed and the organic solution swimming thereon are decanted. During decanting, an extremely thin layer of the solution of the organic film remains on the luminescent screen, which layer is dried by means of a flow of air after the settling bed and the excess solution have been decanted completely.

Aluminum may be provided in known manner by evaporation on the organic film thus obtained. If desired, the organic film may subsequently be removed by heating.

What is claimed is:

1. In the process of forming a luminescent screen by depositing the luminescent material from an aqueous settling bed having a pH of more than 9.5 and containing said luminescent material, a silicate selected from the group consisting of potassium and sodium silicate and a compound selected from the group consisting of alkali metal and alkaline earth compounds other than said silicate on a surface thus forming a luminescent screen, and then adding to said settling bed a solution of an organic film forming material having a specific gravity lower than that of the settling bed, and removing the settling bed to form a thin coherent organic film on the luminescent screen, the improvement which comprises reducing the pH of the settling bed to a value between about 5 and 8.5 by the addition of an acidic substance after the formation of the luminescent screen but before the organic film forming material is added to the settling bed.

2. The process of claim 1 in which a portion of the settling bed is removed after the luminescent screen is formed but before the organic film forming material is added to the settling bed.

3. The process of claim 1 in which the pH value of the settling bed is reduced by the addition of phosphoric acid.

4. In the process of forming a luminescent screen by depositing the luminescent material from an aqueous settling bed having a pH of more than 9.5 and containing said luminescent material, a silicate selected from the group consisting of potassium and sodium silicate and a compound selected from the group consisting of alkali metal and alkaline earth compounds other than said silicate on a surface thus forming a luminescent screen, adding to said settling bed a solution of an organic film forming material having a specific gravity lower than that of the settling bed in an amount greater than that required to form a film on the luminescent screen, and decanting the settling bed and solution of the organic film forming material in such a manner that a thin coherent film of the solution of the organic film forming material is formed on the luminescent screen and then evaporating the solvent from the solution of the organic film forming material to form thereby a dry thin coherent organic film on the luminescent screen, the improvement which comprises reducing the pH of the settling bed to a value between about 5 and 8.5 by the addition of an acidic substance after the formation of the luminescent screen but before the organic film forming material is added to the settling bed.

5. In the process of forming a luminescent screen by depositing the luminescent material from an aqueous settling bed having a pH of more than 9.5 and containing said luminescent material, a silicate selected from the group consisting of potassium and sodium silicate and a compound selected from the group consisting of alkali metal and alkaline earth compounds other than said silicate on a surface thus forming a luminescent screen, adding on said settling bed a solution of an organic film forming material having a specific gravity lower than that of the settling bed in an amount of a solution of an organic film forming material exactly that required to form a coherent film on the luminescent screen, evaporating the solvent from the solution of the organic film forming material to provide a solid organic film floating on the settling bed and removing the settling bed in such a manner that the organic film is deposited on the luminescent screen, the improvement which comprises reducing the pH of the settling bed to a value between about .5 and 8.5 by the addition of an acidic substance after the formation of the luminescent screen but before the organic film forming material is added to the settling bed.

References Cited in the file of this patent

UNITED STATES PATENTS

| | | |
|---|---|---|
| 2,235,802 | Lemaigre | Mar. 18, 1941 |
| 2,238,784 | Scott et al. | Apr. 15, 1941 |
| 2,451,590 | Tidik et al. | Oct. 19, 1948 |
| 2,478,387 | Graham et al. | Aug. 9, 1949 |
| 2,573,051 | Pakswer et al. | Oct. 30, 1951 |
| 2,616,816 | DeGier et al. | Nov. 4, 1952 |
| 2,681,293 | Bayford et al. | June 15, 1954 |
| 2,689,830 | Sadosky et al. | Sept. 21, 1954 |
| 2,732,314 | Kaplan | Jan. 24, 1956 |
| 2,770,557 | Atti | Nov. 13, 1956 |

FOREIGN PATENTS

| | | |
|---|---|---|
| 695,335 | Great Britain | Aug. 5, 1953 |